Figure 1:
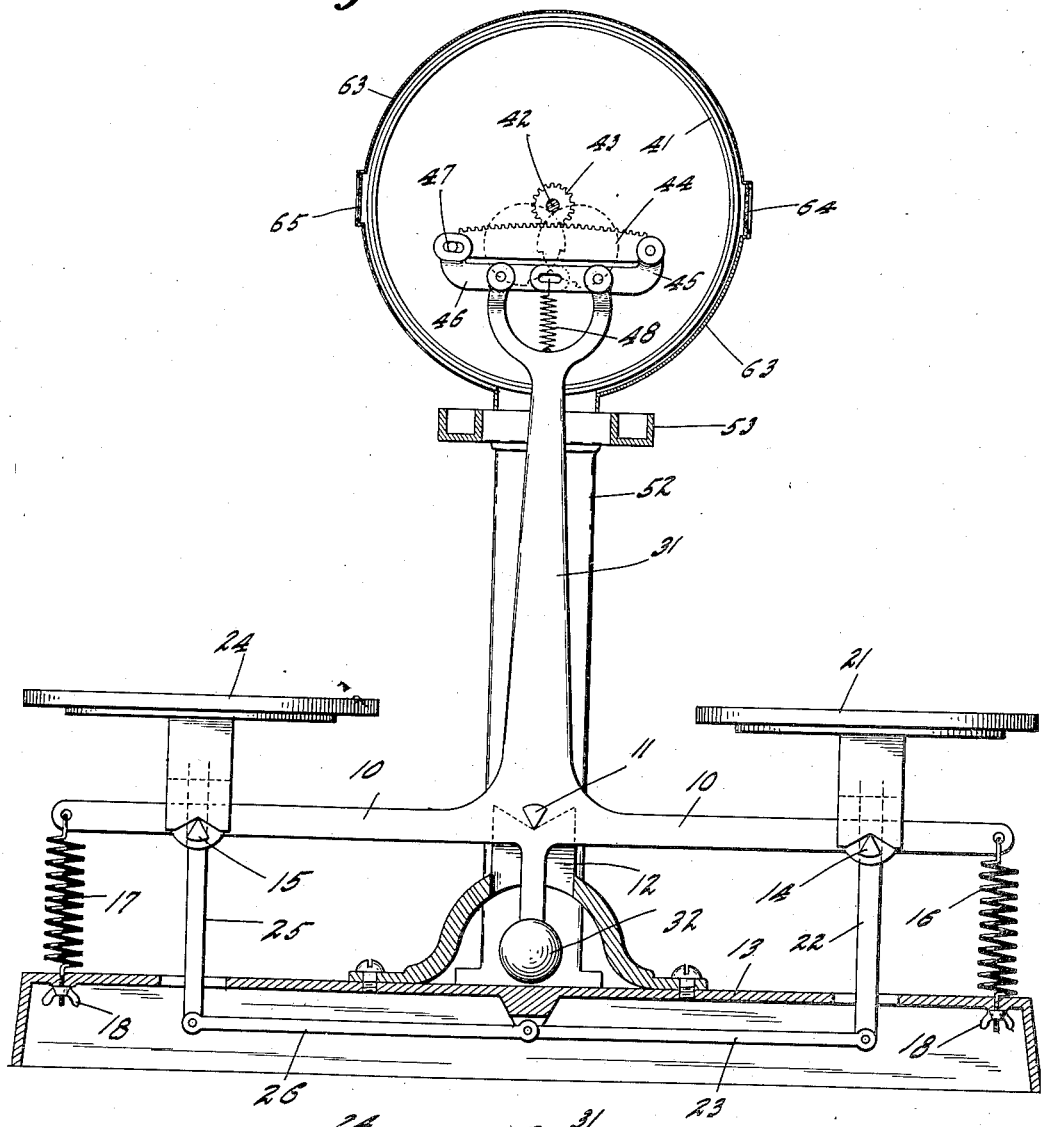

F. P. DUNN.
SCALE.
APPLICATION FILED JUNE 21, 1909.

1,018,173.

Patented Feb. 20, 1912.

2 SHEETS—SHEET 1.

Witnesses
Frank A. Fahle
Thomas H. McMeans

Inventor
Frank P. Dunn,
By Bradford & Hood,
Attorneys

F. P. DUNN.
SCALE.
APPLICATION FILED JUNE 21, 1909.
1,018,173.
Patented Feb. 20, 1912.
2 SHEETS—SHEET 2.
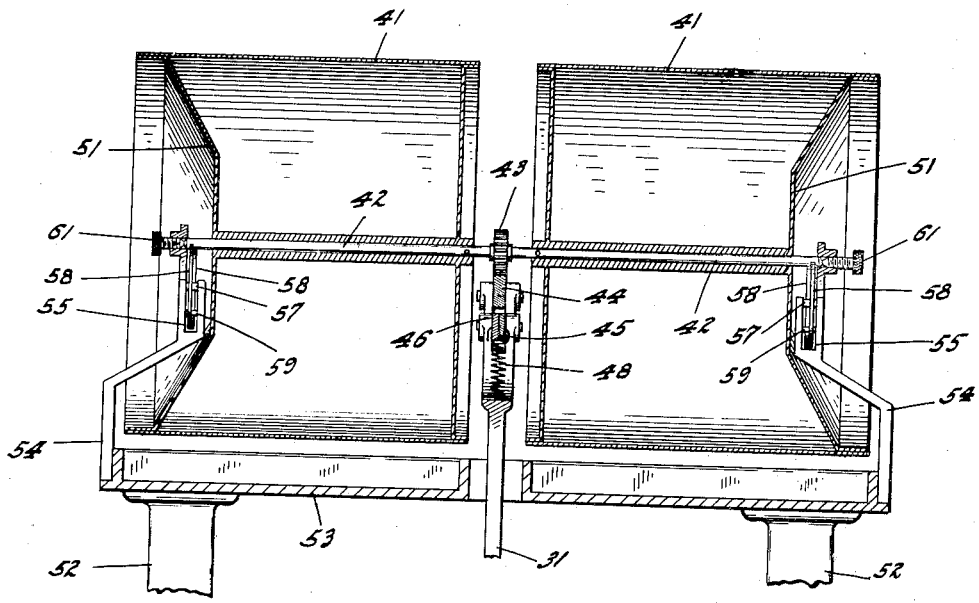
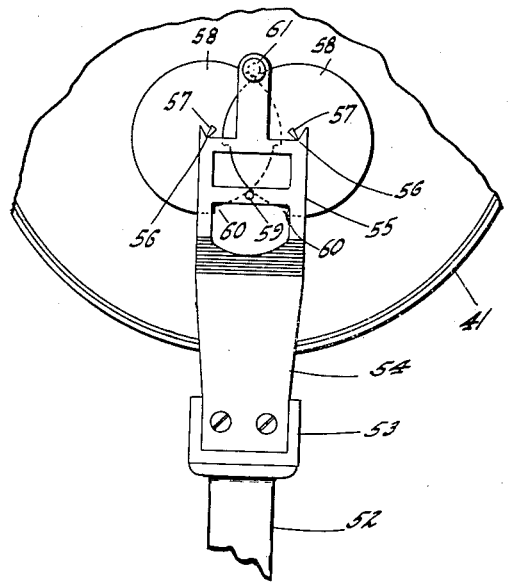
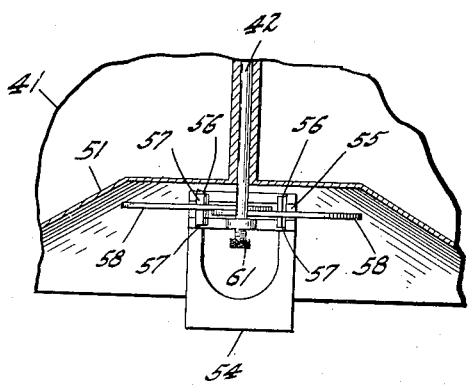
Witnesses
Frank A. Fahle
Thomas W. McMeans
Inventor
Frank P. Dunn,
By Bradford & Hood,
Attorneys.

UNITED STATES PATENT OFFICE.

FRANK P. DUNN, OF ANDERSON, INDIANA, ASSIGNOR TO THE ANDERSON TOOL COMPANY, OF ANDERSON, INDIANA, A CORPORATION OF INDIANA.

SCALE.

1,018,173.  Specification of Letters Patent.  Patented Feb. 20, 1912.

Application filed June 21, 1909. Serial No. 503,337.

*To all whom it may concern:*

Be it known that I, FRANK P. DUNN, a citizen of the United States, residing at Anderson, in the county of Madison and State of Indiana, have invented certain new and useful Improvements in Scales, of which the following is a specification.

The object of my invention is to produce a simple, cheaply constructed scale which shall, nevertheless, be accurate and which shall be free from those common defects of many scales which interfere with accuracy and sensitiveness.

One feature of my invention consists in providing a scale beam fulcrumed intermediate of its ends and provided with a load receiving platform and force exerting means influencing said beam in opposite directions, so that as the load is applied or increased, each force exerting means will vary its influence upon the beam, and one of said force exerting means will have an increasing effect upon the scale beam, while the other will have a corresponding decreasing influence thereon.

There is the further idea or feature of mounting the beam midway between its ends with a load receiving platform upon each end, and a beam influencing means acting upon each end of the beam in such manner that normally and when there is no load applied, the influence of said beam influencing means will be equal, but as a load is applied upon one load receiving platform so as to depress one end of the beam, the beam influencing means at that end of the beam, as said end of the beam moves downwardly, will variably and progressively change the influence it exerts on the beam, while the opposite beam influencing means will vary correspondingly but oppositely in its influence on the beam. And the foregoing is true whether said beam influencing means at each end of the beam tends to depress said end of the beam or to elevate it.

Another feature of the invention consists in combining with an intermediately fulcrumed beam having a load receiving member at each end, so that the scale may be operated from each side of a counter, a rotary indicator drum with indications on each side thereof, and means for revolving the same in each direction according to the side from which the scale is operated, and the drum will be properly actuated and will properly indicate the effect of the applied load at either side thereof. Along with the foregoing I provide also novel means for the actuation of the drum by the beam, and for the mounting of the drum.

The accompanying drawings illustrate my invention.

Figure 5:
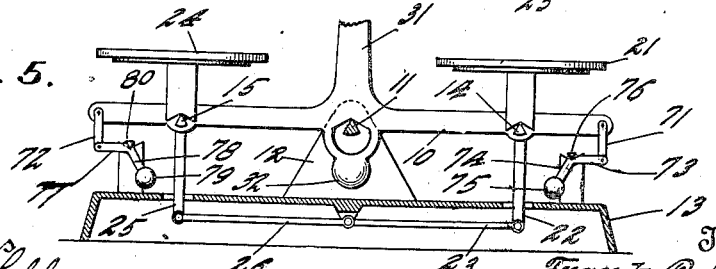

Figure 1 is a side elevation, in partial vertical section, of a scale constructed in accordance with my invention; Fig. 2 an axial section of the indicator drum showing the improved means for supporting and rotating the same; Fig. 3 a detail in side elevation, of my improved means for supporting the rotary indicator drum; Fig. 4 a horizontal detail of the parts shown in Fig. 3, and Fig. 5 a fragmentary vertical section of a modified form.

In the drawings, 10 indicates a beam centrally supported on a knife edge 11 in a suitable supporting bracket 12, carried by the base 13. Beam 10 is provided at its opposite ends with two knife edges 14 and 15 which are equidistant from the knife edge 11 and secured to the opposite ends of beam 10 are two springs 16 and 17 which, in the present instance are shown as tension springs of the same power and under the same degree of tension. The amount of initial tension of the spring is more than that which can be withdrawn by any possible swinging movement of the beam 10. Each spring 16 and 17 is provided with a suitable adjusting nut 18 by means of which the two springs may be balanced against each other. Mounted upon knife edge 14 is a receiving platform 21 which may be maintained in a horizontal position by any suitable and well known means, such for instance as the depending arm 22 and controlling link 23. Mounted upon knife edge 15 is a receiving platform 24 provided with a depending arm 25 and controlling link 26.

Any suitable mechanism may be provided for indicating amount of movement of beam 10 under load so as to thereby indicate the amount or value of such load and in the present construction I have shown a rotary drum indicator for such purpose. Consequently, beam 10 is provided with an upwardly extending arm 31 and, in order to balance this arm 31 upon the knife edge 11, I provide a counterbalance 32.

Difficulty has heretofore been experienced, in the use of drum indicators, in rotatively supporting the drum in such manner that the friction could be negligible and at the same time making the parts sufficiently stiff to withstand the force applied to rotate the same. I have therefore adopted a mechanism for supporting and driving the drum which I believe to be a radical departure from the usual construction and which obviates the difficulties heretofore experienced. The indicator drum is composed of two hollow cylindrical members 41, supported upon a comparatively small central shaft 42, the two drum members being slightly separated at their adjacent ends. Secured to shaft 42 at its middle between the two drums 41, is a small pinion 43 engaging a segmental rack 44 which is pivotally connected at its opposite ends to a pair of levers 45 and 46, the pivotal connection with the lever 46 being also a sliding connection as indicated at 47 for a reason which will appear. The levers 45 and 46 are pivotally mounted upon the upper end of arm 31 and the adjacent ends of the two levers 45 and 46 are projected toward each other and connected to these adjacent ends of the two levers is one end of a light spring 48, said spring urging the outer ends of levers 45 and 46 upward and therefore continuously urging rack 44, with a comparatively light pressure, into continuous and uniform engagement with pinion 43, thus insuring a proper and uniform meshing of the teeth of rack 44 with the teeth of pinion 43 and preventing any back lash between the drum and arm and thus insuring an accurate indication of the amount of movement of arm 31 around knife 11.

It is desirable that the shaft 42 of the indicator drum be comparatively small but where a single driving pinion is provided for the shaft and arranged in its middle there would be likely to be a considerable amount of spring at the middle of the shaft if it were of the full length of the drums. In order, therefore, to shorten the shaft each drum 41, at its outer end, is supported by a spider or dish-shaped support 51 which overhangs to a considerable extent the end of shaft 42. Arising from base 13 at opposite sides of arm 31 are standards 52 connected at their top by suitable cross bar 53 and secured to the opposite ends of the cross bar 53 are brackets 54 which are projected into the outer ends of drums 41. At its inner end each bracket 54 is bifurcated at 55 and provided with two sets of knife edge crotches 56, in each of which is supported a knife edge 57 forming an axial support for a disk 58. The two disks 58, overlap each other in the vertical plane of the axis of shaft 42, the shaft 42 thus being rollingly supported in the crotch between the overlapping disks 58. Too great a rocking movement of the disks 58 is prevented by a stop pin 59 carried by a bracket 54 and projected into circumferential notches 60 formed in the lower overlapping edges of disks 58. Endwise movement of shaft 43 may be prevented by means of temper screws 61 carried by brackets 54, which screws do not, however, support any portion of the weight of the drums 41.

Drums 41, may be inclosed in a suitable inclosing casing 63 supported on standards 52 and provided with sight openings 64 and 65 at opposite sides of the drums. Of course, other desirable arrangements of two sets of graduations on the drums may be made without departing from my invention.

The operation is as follows: The scale will be placed upon a counter accessible from either side and platform 21 will then be used from one side of the counter and platform 24 from the other side of the counter. At all times the merchant will be able to take a reading from the sight opening immediately in front of him and the customer will be able to take a similar reading from the sight opening in front of him. Supposing the scale to have a maximum capacity of ten pounds, the springs 16 and 17 will be placed under a tension in excess of five pounds each and, acting upon the scale beam 10 in opposite direction, will balance each other. If a load of one pound be placed upon platform 21 scale beam 10 will move so as to shift arm 31 to the right (Fig. 1) until the tension in spring 17 has been increased one-half pound and the tension in spring 16 has been decreased one-half pound whereupon the structure will become balanced on knife edge level and the drums 41 will have been rotated an amount indicating the amount of displacement of arm 31. In this movement of the drum rack 44 will have been kept in constant and uniform mesh with pinion 43 and the shaft 42 will have rolled in the crotch between the two disks 58, said disks rolling in opposite directions upon their knife edges 57. It will appear from this that it is possible to give shaft 42 a complete rotation, more or less, upon a support which has all of the advantages of a knife edge support which, by ordinary construction, will not permit a movement of any considerable angle. Of course it will be readily understood that the application of any other load upon platform 21 will produce similar results varying in amount by the amount of the load and if value indications are desired instead of weight indications the drums 41 will be provided with proper graduations. If, by chance, it is desired to weigh a load in excess of the normal capacity of the scale, it is merely necessary to place upon the opposite platform a standard weight of known value. For instance, if the normal capacity of the scale is ten pounds and an article weighing 12 lbs. is to be weighed it is merely necessary to place upon one of the receiving platforms a standard two pound weight (actual weight), or any other weight of known value less than the weight of the article to be weighed, and then add to the scale reading the weight value of the weight so used.

It will be readily understood that the results already described may be produced by substitutes for the springs 16 and 17, such substitutes being of any character which, when moved in one direction, will have a gradually increasing effect upon the scale beam, and, when moved in the opposite direction, will have a gradually decreasing effect upon the scale beam. For instance, in Fig. 5, I have shown a structure of this character. In this construction the scale beam 10 is provided, at its opposite ends, with depending links 71 and 72. Link 71 is connected with the horizontal arm 73 of a lever having an inwardly and downwardly inclined arm 74 to which is attached a weight 75, the lever being supported upon a suitable knife edge 76. Similarly, link 72 is connected to the horizontal arm 77 of a lever having a downwardly and inwardly inclined arm 78 which has attached to it a weight 79, the lever being supported upon a suitable knife edge 80. The two weights 75 and 79, together with the levers carrying the same, are duplicates and have an exactly equal effect, in opposite directions, upon scale beam 10, the said weights lying, when the scale beam 10 is horizontal, above the depending position which they would ordinarily assume if freed. If a load be applied to the right hand receiving platform 21, weight 75 will be moved upward and thus have a gradually increasing effect upon the scale beam, and thus a gradually increasing resistance to the applied load, while weight 79 will move downward and thus have a gradually decreasing effect upon the applied load. The result upon the applied load is exactly the same as in the structure shown in Fig. 1, although the action at the two ends of the beam 10 is directly opposite to the action of the springs 16 and 17.

By using the two springs (or other force-exerting members) one acting against the other, changes in temperature will not affect the accuracy of the scale because any lengthening or shortening of one spring will be balanced by a corresponding change in the opposing spring.

I claim as my invention:

1. In a weighing scale, a base, a scale beam mounted thereon and having an intermediate fulcrum, a weight depending from said beam beneath said fulcrum, an arm extending upward from said fulcrum, means actuated by said arm for indicating the weight of the load, and a spiral spring secured to each end of the scale beam and said base, substantially as set forth.

2. In a weighing scale, the combination, with a scale beam and a rotary indicator having a driving pinion, of a pair of levers carried by the scale beam upon axes substantially parallel with the axis of the pinion, a rack carried by the ends of said levers and meshing with the pinion, and means for yieldingly swinging said levers upon their axes to urge the rack into mesh with the pinion.

3. In a weighing scale, the combination, of a rotary pinion, a rack meshing with said pinion, a pair of levers connected at their outer ends with said rack to support the same, and a spring operating upon the inner ends of both the levers to yieldingly urge the rack into mesh with the pinion throughout the length of the rack.

4. In a weighing scale, the combination, of a rotary pinion, a rack meshing with said pinion, a pair of levers pivoted upon axes substantially parallel with the axis of the pinion and connected at their outer ends with said rack to support the same, and a spring operating upon the inner ends of both the levers to yieldingly urge the rack into mesh with the pinion throughout the length of the rack.

In witness whereof, I have hereunto set my hand and seal at Indianapolis, Indiana, this seventeenth day of June, A. D. one thousand nine hundred and nine.

FRANK P. DUNN. [L. S.]

Witnesses:
CHESTER BRADFORD,
THOMAS W. MCMEANS.